United States Patent
Deb

(10) Patent No.: US 10,630,582 B1
(45) Date of Patent: Apr. 21, 2020

(54) SCALABLE BORDER GATEWAY PROTOCOL ROUTING

(71) Applicant: Amazon Technologies, Inc., Seattle, WA (US)

(72) Inventor: Bashuman Deb, Aldie, VA (US)

(73) Assignee: Amazon Technologies, Inc., Seattle, WA (US)

(*) Notice: Subject to any disclaimer, the term of this patent is extended or adjusted under 35 U.S.C. 154(b) by 166 days.

(21) Appl. No.: 15/608,946

(22) Filed: May 30, 2017

(51) Int. Cl.
| | |
|---|---|
| *H04L 12/713* | (2013.01) |
| *H04L 12/715* | (2013.01) |
| *H04L 12/701* | (2013.01) |
| *H04L 12/46* | (2006.01) |

(52) U.S. Cl.
CPC ............ *H04L 45/586* (2013.01); *H04L 45/04* (2013.01); *H04L 12/4641* (2013.01); *H04L 45/00* (2013.01); *H04L 45/46* (2013.01)

(58) Field of Classification Search
None
See application file for complete search history.

(56) References Cited

U.S. PATENT DOCUMENTS

| | | | | |
|---|---|---|---|---|
| 2011/0142053 A1* | 6/2011 | Van Der Merwe | ..... | H04L 47/72 370/395.1 |
| 2017/0093646 A1* | 3/2017 | Chanda | ................. | H04L 41/042 |

OTHER PUBLICATIONS

Rekhter, Y., et al., "A Border Gateway Protocol 4 (BGP-4)," Request for Comments: 4271, Standards Track, Jan. 2006, 105 pages. (Year: 2006).*
Rekhter, Y., et al., "A Border Gateway Protocol 4 (BGP-4)," Request for Comments: 1771, Standards Track, Mar. 1995, 58 pages.
Rekhter, Y., et al., "A Border Gateway Protocol 4 (BGP-4)," Request for Comments: 4271, Standards Track, Jan. 2006, 105 pages.
Rekhter, Y., and P. Gross, "Application of the Border Gateway Protocol in the Internet," Request for Comments: 1772, Standards Track, Mar. 1995, 20 pages.
Traina, P., "Autonomous System Confederations for BGP," Request for Comments: 1965, Experimental, Jun. 1996, 8 pages.
Bates, T., and R. Chandra, "BGP Route Reflection: An Alternative to Full Mesh IBGP," Request for Comments: 1966, Experimental, Jun. 1996, 7 pages.
Chandra, R., et al., "BGP Communities Attribute," Request for Comments: 1997, Standards Track, Aug. 1996, 6 pages.
Stewart, J., et al., "Using a Dedicated AS for Sites Homed to a Single Provider," Request for Comments: 2270, Informational, Jan. 1998, 6 pages.
Bates, T., et al., "Multiprotocol Extensions for BGP-4," Request for Comments: 2283, Standards Track, Feb. 1998, 9 pages.
Heffernan, A., "Protection of a BGP Sessions via the TCP MD5 Signature Option," Request for Comments: 2385, Standards Track, Aug. 1998, 6 pages.

(Continued)

*Primary Examiner* — Ayaz R Sheikh
*Assistant Examiner* — Sori A Aga
(74) *Attorney, Agent, or Firm* — Davis Wright Tremaine LLP

(57) ABSTRACT

In a computing resource service provider environment, Border Gateway Protocol (BGP) routers may connect various networked environments. In addition, the implementation of the BGP router may be distributed between computing resources within the computing resource service provider environment. A subset of hosts may be selected from a set of hosts within the computing resource service provider environment. The subset of hosts may be selected to implement the BGP router, the adjacency-in routing information, and the adjacency-out routing information.

20 Claims, 9 Drawing Sheets

(56) References Cited

OTHER PUBLICATIONS

Villamizar, C., et al., "BGP Route Flap Damping," Request for Comments: 2439, Standards Track, Nov. 1998, 38 pages.
Marques, P., and F. Dupont, "Use of BGP-4 Multiprotocol Extensions for IPv6 Inter-Domain Routing," Request for Comments: 2545, Standards Track, Mar. 1999, 5 pages.

\* cited by examiner

SCALABLE BORDER GATEWAY PROTOCOL ROUTING

BACKGROUND

To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. In a large distributed computing system (e.g., multiple distributed data centers) of a computing resource service provider, various customers, users, services, and resources of the computing resource service provider are frequently shared between customers. In addition, these computing resources are often leveraged in large-scale networks of computers, servers, and storage drives to enable clients, including content providers, online retailers, customers and the like, to host and execute a variety of applications and web services.

The usage of network computing allows content providers and customers, among others, to efficiently and adaptively satisfy their computing needs. However, with the growing use of virtual resources, customers are encountering situations in which networking these virtual resources becomes difficult and does not scale well. In addition, customers may operate these virtual resources within virtual private networks secure from other computing resources outside of these virtual private networks. However connecting these virtual private networks so that virtual resources or other computing resources within these virtual private networks can communicate also becomes increasingly difficult as the size, complexity, and number of these virtual private networks increases. Many technologies such as Border Gateway Protocol (BGP) do not provide a mechanism for effectively scaling either in the amount of routing information or the number of these virtual private networks that are interconnected.

BRIEF DESCRIPTION OF THE DRAWINGS

Various techniques will be described with reference to the drawings, in which.

DETAILED DESCRIPTION

Figure 1:
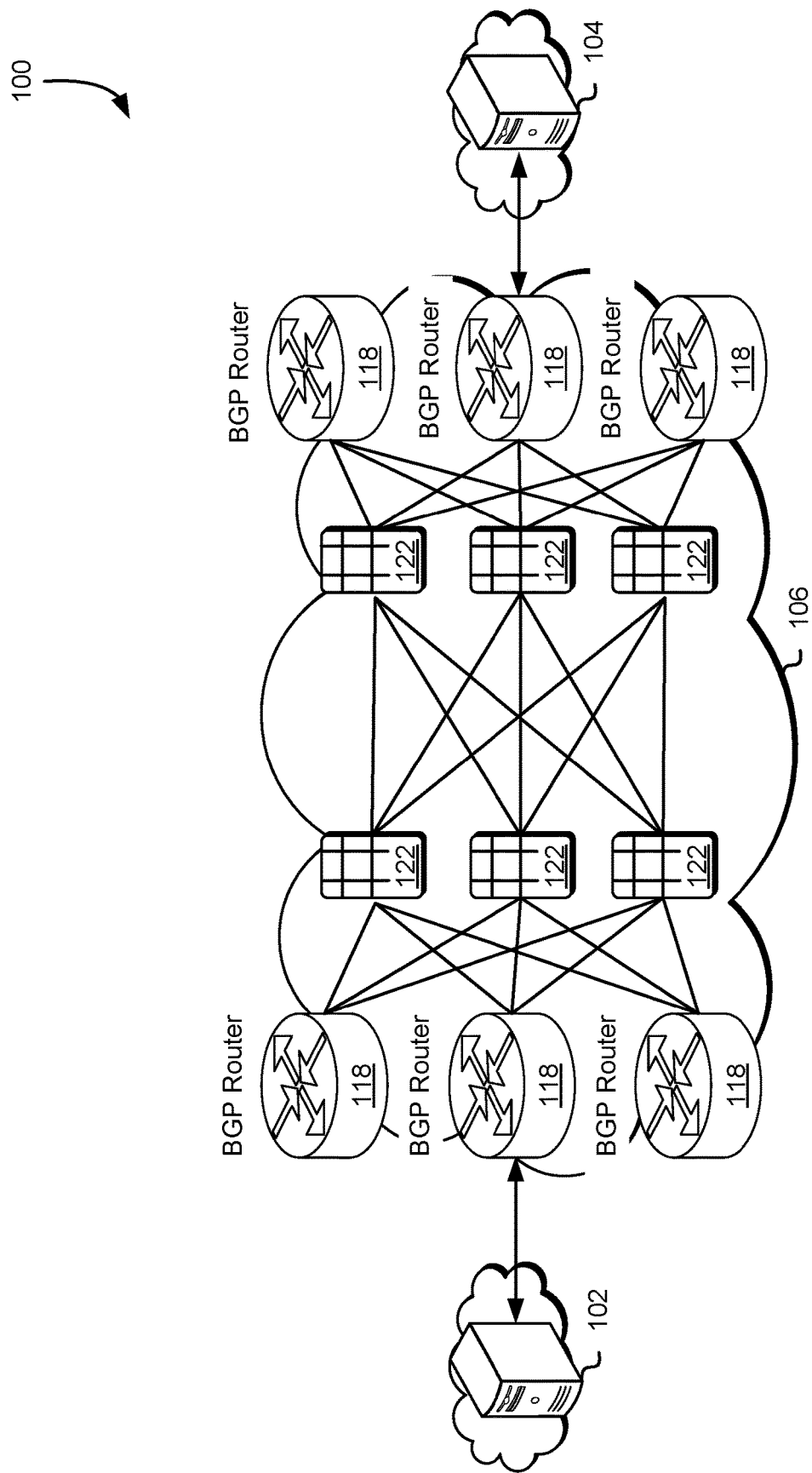
FIG. 1 illustrates an environment in which BGP router implementation may be distributed across a plurality of host computer systems in accordance with an embodiment.

In various examples, a customer of a computing resource service provider uses an interface of the provider to request Border Gateway Protocol (BGP) routers to be instantiated and provisioned such that the customer requested BGP routers can route traffic to various computing resources across various networks. The computing resource service provider may operate a plurality of data centers containing computing resources used to support the execution of computer system instances and other computing resources including networking resources operated by a plurality of customers. The computing resource service provider may provide a customer with access to the computing resources through various services, such as a BGP scaling service or other services described in greater detail below. In addition, a customer may operate computing resources within an isolated network environment, such as a virtual private network, utilizing computing resources provided by the computing resource service provider. Furthermore, customers may also operate independent data centers or other collections of computing resources not provided by the computing resource service provider. In various embodiments described in detail below, the customers may use BGP routers and routing information to enable communication between isolated networking environments both within the computing resource service provider environment and outside the computing resource service provider environment.

In an embodiment, the computing resource service provider provides a set of host computer systems to execute BGP routers and maintain routing information on behalf of the customer. A customer can request a BGP router, and the BGP scaling service may determine a particular host computer system to execute the requested BGP router as well as a host computer system to maintain and/or store routing information. In various embodiments, each BGP router is associated with one host computer system that maintains adjacency-in routing information and one host computer system that maintains adjacency-out routing information. Distributing the operation and processing of BGP routers improves scalability and operation of the BGP implementation. For example, as described above, customers can share computing resources such as host computer systems, thereby reducing cost and increasing efficiency. In another example, as routing information grows and routing tables become larger, implementation of the BGP router (e.g., hosts maintain adjacency-in routing information and/or adjacency-out routing information) can be moved to larger host computer systems or a host computer system with less load (e.g., maintaining less information or supporting fewer customers).

As discussed in the present disclosure, the BGP routers may be used to facilitate communication between a single customer's virtual private networks and/or external (e.g., outside of the computing resource service provider environment) computing resources as well as between a plurality of customers of the computing resource service provider. In various embodiments, customers transmit Application Program Interface (API) calls to request, modify, or otherwise manage BGP routers to the BGP scaling service. In yet other embodiments, the BGP scaling service provides a management console implemented as a webpage to enable customers to request, modify, or otherwise manage BGP routers. For example, the customer may update routing information for a particular BGP router (e.g., adding or removing BGP peers), the routing update is received at the host computer system implementing the BGP router and transmitted to the host computer system implementing the adjacency-in routing information. As described in greater detail below, BGP peers include BGP routers that have exchanged routing information and can route traffic to each other. The host computer system implementing the adjacency-in routing information may then determine updated routing information (if any) to provide to the host computer system implementing the adjacency-out routing information and transmit the updated routing information. For example, the updated routing information indicates a new BGP peer that the BGP router can communicate with.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which customer operated BGP routers 118 facilitate communications between computing resources based at least in part on routing information 122 maintained by a plurality of host computer systems in accordance with an embodiment. As illustrated by FIG. 1, the BGP routers 118 connects a first network environment 102 to a second network environment 104. The various networks illustrated in FIG. 1, including network 106, may include a variety of different communication networks such as the Internet, an intranet, virtual private network, edge network, or an Internet service provider (ISP) network. In addition, all or a portion of the networks illustrated in FIG. 1 may be operated by a computing resource service provider as described in greater detail below.

The first network environment 102 and the second network environment 104, in various embodiments, include a set of computing resources that can communicate over one or more networks included in the network environment. For example, the computing resources include virtual computer system instances operated by a customer and executing an application on behalf of the customer. In various embodiments, the first network environment 102 and the second network environment 104 are operated by distinct customers (e.g., not the same entity or individual). In yet other embodiments, the first network environment 102 and the second network environment 104 are operated by the same customer. In addition, at least a portion of the computing resources within the first network environment 102 may be operated by the computing resource service provider. For example, the BGP routers 118 and routing tables 122 may be implemented by computing resources of the computing resource service provider as described in greater detail below.

As illustrated in FIG. 1, the BGP routers 118 may be executed using computing resources such as host computer systems (e.g., physical server computers or fixed hosts), virtual computer systems (e.g., virtual machine instances or container instances), and/or a combination thereof. In various embodiments, the BGP routers 118 include source code or other executable instructions that, when executed by one or more processors of the computing resources, cause the computing resources to implement "A Border Gateway Protocol 4 (BGP-4)" as defined in RFC 4271 which obsoletes RFC 1771, which are incorporated by reference to the same extent as if each reference were individually and specifically indicated to be incorporated by reference and were set forth in its entirety.

In various embodiments, the BGP routers 118 provide Classless Inter-Domain Routing (CIDR) to enable communications between a plurality of autonomous systems. The autonomous systems include a network environment such as the first network environment 102 or the second network environment 104, computing resources, and a set of routers under a single technical administration capable of routing information internally. The BGP routers 118 provide a mechanism for routing information between autonomous systems. As described in the present disclosure, a BGP scaling service is broken down into three layers. The first layer and/or component includes a BGP/Transmission Control Protocol (TCP) component that manages the communications between BGP routers 118. For example, this component includes various computing resources that marshals and unmarshals on-the-wire messages over TCP connections managed by the BGP router.

The second layer includes adjacency-in information which includes various routes (e.g., routing information) that have been advertised to the local BGP router 118 by one or more peers (e.g., other BGP routers 118 connected over a TCP connection to the local BGP router 118). This information, in various embodiments, is maintained by a node or other computing resources illustrated as a routing table 122 within the network 106. The routing table 122 may include a variety of different data structures suitable for maintaining routing information such as the adjacency-in and adjacency-out routing information as described in the present disclosure. In addition, as described in greater detail below, the node or other computing resource implementing the adjacency-in information may include source code or other executable instructions that, when executed, cause the node or other computing resource to determine routing update information to provide to another node or computing resource implementing the adjacency-out information. The adjacency-in information includes information indicating a set of BGP routers 118 which have established routes (e.g., executed a BGP handshake with the particular BGP router maintaining the adjacency-in information in accordance with the BGP protocol) such that the BGP routers 118 can route traffic to the particular BGP router maintaining the adjacency-in information. Similarly, the adjacency-out information includes information indicating a set of BGP routers 118 which the particular BGP router maintaining the adjacency-out information has established routes with in accordance with the BGP protocol.

Finally, the third layer includes adjacency-out information that contains the route information for peers (e.g., other BGP routers 118) that may be communicated with. As described in greater detail below, the adjacency-out information may be maintained as a routing table 122 implemented by a node or other computing resource. In addition, the routing information maintained by the node or other computing resources implementing the adjacency-out information may be updated by an update message or other message from the adjacency-in information. Each layer (e.g., the BGP router 118, adjacency-in routing table, and adjacency-out routing table) may be implemented by different computing resources in accordance with various embodiments described in greater detail below.

Figure 2:
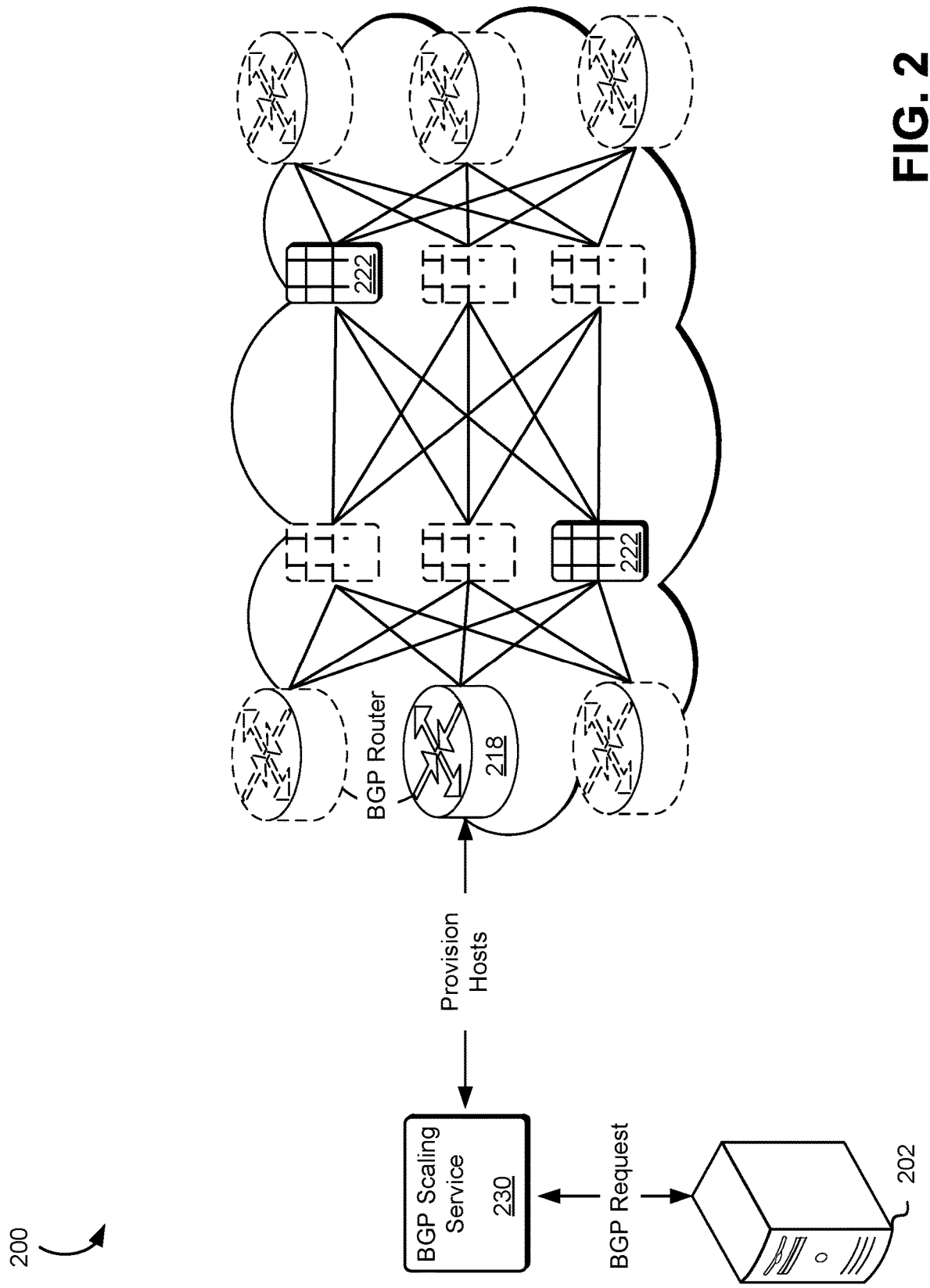
FIG. 2 illustrates an environment in which BGP routers may be provisioned across a plurality of host computer systems in accordance with an embodiment.

FIG. 2 illustrates an environment 200 in which a customer 202 may request a BGP router 218 to be provisioned using computing resources of a computing resource service provider in accordance with an embodiment. The computing resource service provider may operate a BGP scaling service 230 to provide the customer 202 with access to the BGP router 218. For example, as described in greater detail below in connection with FIGS. 3 and 4, the BGP scaling service 230 may provide a management console exposed to the customer 202 as a webpage to enable the customer 202 to request and manage the BGP router 218. In another example, the customer 202 may transmit API calls to the BGP scaling service 230 to request and manage the BGP router 218.

Upon receipt of a request for a BGP router, the BGP scaling service 230 may determine a set of hosts to implement various components of the BGP router 218. In other embodiments, a placement service or other service of the computing resource service provider may determine a set of hosts suitable for executing various components of the BGP router 218. For example, a placement service determines a set of hosts to execute one or more routing tables 222 based at least in part on a placement algorithm and/or metric information associated with the set of hosts. Various placement algorithms may be used in connection with the present disclosure such that computing resources implementing the various components of the BGP router 218 (e.g., the BGP router 218, adjacency-in routing table, and adjacency-out routing table) are not overloaded or otherwise within a value relative to a threshold value associated with the capacity and/or load on the computing resources. Determination of the set of hosts to implement various components of the BGP router 218 may be made based at least in part on usage patterns of customers of the BGP scaling service 230. For example, customers that make frequent changes to BGP routing information or have large amount of routing information may be placed on hosts that have less load or support fewer customers. The BGP scaling service 230, in various embodiments, tracks customer activity (e.g., the number of times a customer modifies BGP routing information or the amount of BGP routing information the customer provides) and placement decisions based at least in part on an amount of computing resources associated with the customer. For example, if a particular customer submits frequent request to modify BGP routing information and therefore consumes additional computing and network resources relative to at least one other customer, the BGP scaling service 230 may place the particular customer on a host with lower network and/or computing load. In another example, if a particular customer has a large amount of routing information relative to at least one other customer, the BGP scaling service 230 may place the particular customer on a host with a certain amount of storage capacity.

For example, the components of the BGP router 218 (e.g., the BGP router 218, adjacency-in routing table, and adjacency-out routing table) may be sharded based at least in part on customer identification information or other information suitable for distributing the components of the BGP router 218. The components of the BGP router 218 are sharded across multiple computing resources by horizontally partitioning execution of the components among computing resources capable of executing each component. This may to improve performance, reliability, and availability of the BGP routers 218. Sharding the components of the BGP router 218, in various embodiments, causes the components of the BGP router 218 to be horizontally distributed among a set of host computer systems. For example, the components of the BGP router are sharded among the set of host computer systems according to a sharding pattern. Various sharding patterns and/or techniques, such as shuffle sharding, may be used in connection with the present disclosure. Shuffle sharding, in various embodiments, includes random or pseudorandom placement/distribution of computing resources. For example, shuffle sharding uses hashing (e.g., bloom filters) to take customer identification information, data objects, or other identifiers to generate a shuffle shard pattern which can then be used to distribute computing resources. The BGP scaling service 230, in various embodiments, distributes a set of hosts capable of implementing various components of the BGP router 218 into shuffle shards randomly or pseudorandomly. Shuffle shards a logical grouping of host computer systems. Customers may be assigned to one or more shuffle shards based at least in part on a hashing algorithm and/or consistent hash ring. For example, customer identification information is combined with BGP router 218 router information and is used as an input to a particular hashing algorithm where the key space of the particular hashing algorithm is divided into distinct ranges with a shuffle shard assigned (e.g., a logical grouping of hosts capable of implementing components of the BGP router 218) to the distinct ranges. In this manner, the result of the particular hash algorithm maps customers to a particular range of the key space associated with a particular shuffle shard including hosts capable of implementing components of the BGP router 218. The BGP scaling service 230 may then select a particular host included in the shuffle shard to execute a component of the customer's BGP router 218.

Returning to FIG. 2, the BGP scaling service 230 may determine a set of hosts to execute the BGP router 218 and routing tables 222. In an embodiment, the BGP scaling service 230 then transmits a provisioning request to the set of hosts to execute a particular component of the BGP router 218. As illustrated in FIG. 2, the computing resources shown with solid lines are the computing resources determined by the BGP scaling service 230 to execute the various components of the BGP router 218. Similarly, the computing resources shown in FIG. 2 with the dashed lines are computing resources not included in the set of hosts (e.g., not determined by the BGP scaling service to execute the various components of the BGP router 218). In addition, the BGP scaling service 230 may detect the failure of one or more components of the BGP router 218 and cause new computing resources to be instantiated to replace failed components. New components (e.g., BGP routers 218, adjacency-in routing table, and adjacency-out routing table) may communicate with existing components to obtain information to perform various routing operations.

Figure 3:
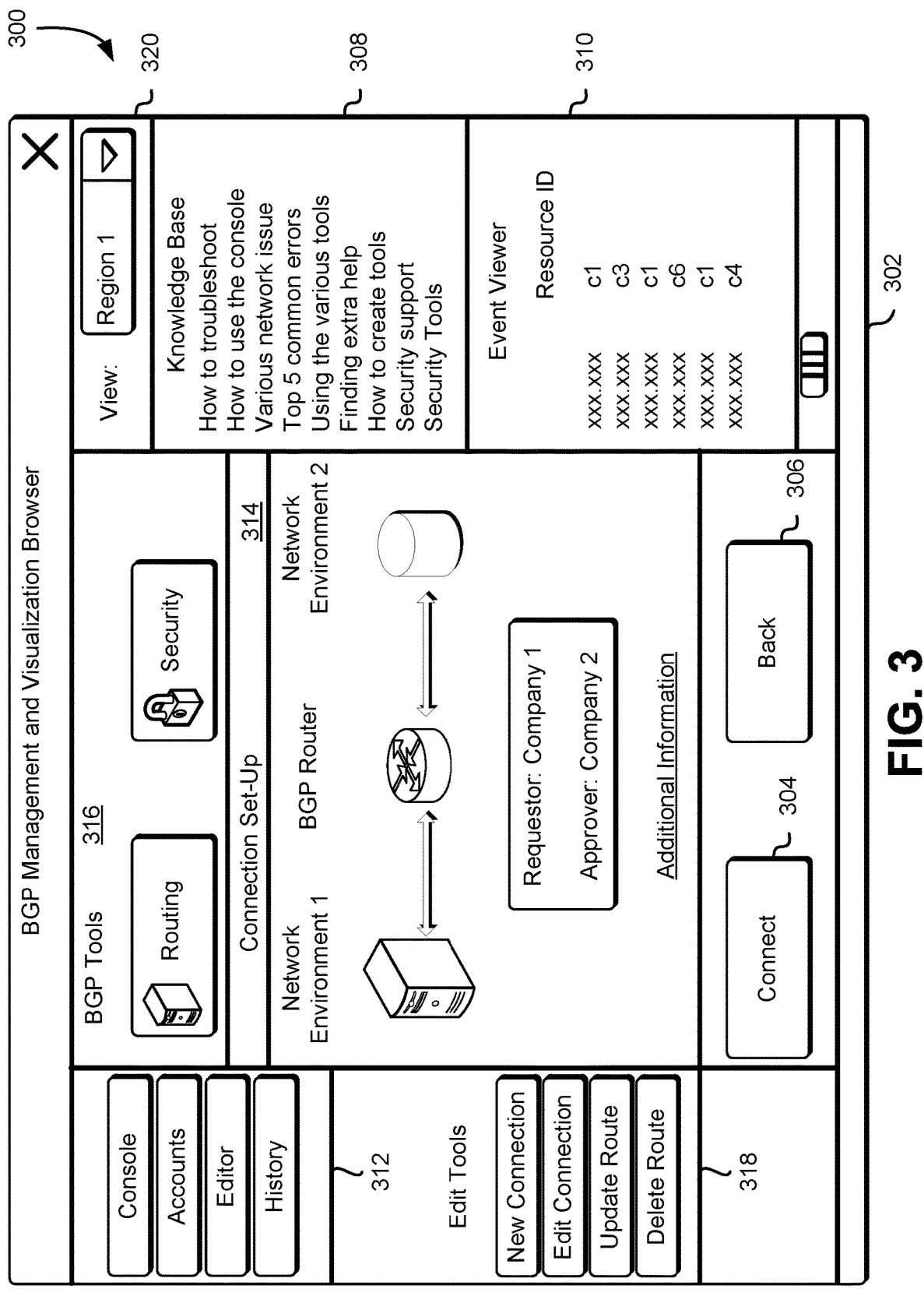
FIG. 3 is a diagram illustrating a management console implemented as a webpage for managing and provisioning BGP routers in accordance with at least one embodiment.

FIG. 3 illustrates an example environment 300 where a remote BGP management and visualization browser 302 may be used to request, provision, and/or connect BGP routers as described in the present disclosure at least as described above in connection with FIG. 1 and in accordance with at least one embodiment. The remote BGP management and visualization browser 302 enables a customer to generate BGP connections, detect attempts to establish a BGP connection with a peer BGP router, perform route update operations, troubleshoot connection issues associated with computing resources of a BGP scaling service, receive recommendations associated with network architecture, search a knowledge base for information related to the BGP networking, and generally diagnose, establish, and manage BGP routers. In various embodiments, the remote BGP management and visualization browser 302 is a computer system service such as a web service and provided as a BGP scaling service of the computing resource service provider as described in the present disclosure.

As illustrated in FIG. 3, the remote BGP management and visualization browser 302 is provided as a user interface executed by an application, such as a web browser executing on a computer system operated by the customer, as well as other user interfaces that may be used to present BGP routing information and connection information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The computing resource service provider may receive the selection information from the customer's computing device and provide the information to other computing resources of the BGP scaling service. For example as illustrated in FIG. 3, the customer's request connect 'Network Environment 1' to 'Network Environment 2' through 'BGP Router' causes the computing resource executing the remote BGP management and visualization browser 302 to transmit the request to the BGP scaling service. The user interface may be generated or caused to be generated by the BGP service as described in the present disclosure.

The remote BGP management and visualization browser 302 may include BGP connection tools 316 that aid the customer in generating and/or establishing BGP connections between computing resources and/or visualization thereof in the remote BGP management and visualization browser 302. For example, the BGP connection tools 316 may include a graphical user interface element, such as the buttons illustrated in FIG. 3, where selection of the graphical user interface element may cause the BGP scaling service to display information to the customer to aid the customer in establishing a connection or managing information associated with a particular computing resource or type of computing resource indicated in the button associated with the selected graphical customer element. For example, selection of the 'Routing' button causes the display of routing information in a connection set-up 314 display pane of the remote BGP management and visualization browser 302. Based at least in part on the information displayed, the customer may establish a connection with the displayed network environments.

In yet other embodiments, the BGP scaling service may detect another customer attempting to establish a connection with a particular BGP router operated by the customer. In such embodiments, the connection set-up 314 display pane of the remote BGP management and visualization browser 302 displays information about the requestor and the network environments to be connected. As illustrated in FIG. 3, the remote BGP management and visualization browser 302 includes a connect button 304 and a back button 306. Selection by the customer of the connect button 304 may cause the underlying code executing the remote BGP management and visualization browser 302 to transmit information to the BGP scaling service to establish the connection illustrated in the connection set-up display pane. As a result the BGP scaling service may transmit routing information to a particular BGP router which may cause an update to routing information associated with the particular BGP router as described in greater detail below. Selection of the back button 306 may cause the underlying code executing the remote BGP management and visualization browser 302 to navigate to a previously navigated page of the remote BGP management and visualization browser 302.

In various embodiments, the remote BGP management and visualization browser 302 produces the graphical representation of BGP information based at least in part on a set of events detected by the BGP scaling service. For example, the remote BGP management and visualization browser 302, in response to a request from a customer, transmits an API call or other command to the BGP scaling service to obtain BGP information generated based at least in part on the BGP scaling service provisioning and/or managing BGP routers. In various embodiments, the customer is prompted to provide additional information and/or configure additional resources as a result of the requesting a BGP router. For example, the customer is prompted to provide a network address for the BGP router or information associated with network environments the BGP router is to connect. The graphical representation of the BGP information may be displayed using tables, block diagrams, generated images, or visualization elements and may, in some embodiments, include one or more icons.

As illustrated in FIG. 3, the remote BGP management and visualization browser 302 further includes a set of options 312 used to perform various functions in connection with the remote BGP management and visualization browser 302. The set of options 312 may be a set of functions included in the remote BGP management and visualization browser 302 that enables a customer to perform a variety of operations such as managing accounts, creating BGP routers, creating routing information, and managing customer-operated computing resources. The options 312 may be configured as graphical user interface elements of the remote BGP management and visualization browser 302.

The account button may be configured to enable the customer to select particular customer accounts to perform various operations associated with a particular service in connection with the selected customer accounts. In various embodiments, the customer operating the remote BGP management and visualization browser 302 is required to have, at the minimum, complete read permissions across all of the customer services and computing resources associated with the accounts for which the customer is attempting to perform operations associated with the particular service. The editor button may be configured to enable the customer to create or edit BGP routers and/or connections between BGR routers (e.g., routing information).

In various embodiments, the customer is provided with resources to aid in determining what connections can be established between networked environments and what BGP routers and/or connections may require attention. Once a BGP router and/or connection is created (e.g., by a customer or as part of an automated or partially automated process), the BGP scaling service may provide the customer with BGP information or other information indicating requirements, dependencies, privileges, connections, and/or access based at least in part on the BGP information. For example, once the BGP service provisions a new BGP router, the customer is provided with a network address of the BGP router to enable the customer to establish communications with the BGP router. In another example, once a connection is made between two or more networked environments, the customer may be provided with routing information between to the two or more networked environments.

In addition, the BGP information, routing information, and other information may be saved in such a manner that the information is accessible to all customer accounts and/or all other customers of the computing resource service provider. The remote BGP management and visualization browser 302 may further include an event viewer 310. The event viewer may be configured to provide information related to anomalous or other events detected during the operation or establishment of BGP routers. This information may provide a set of data associated with systemic, operational, or maintenance events associated with a particular BGP router along with schedules and remediation suggestions. For example, the event may include information indicating a particular BGP router attempting to connect to a another BGP router and whether the attempt was successful based at least in part on a set of permissions managed by a policy management service.

The information displayed in the event viewer 310 may be generated automatically or in response to a request and/or operation of the customer. The remote BGP management and visualization browser 302 may also include a knowledge base 308 that includes articles and provides access to curated content based at least in part on the information collected from customers of the computing resource service provider or generated by the computing resource service provider. The knowledge base may include suggestions on BGP router connections and/or configurations of BGP routers for specific computing resources or suggest relevant BGP router information. In addition, the BGP scaling service may suggest or recommend particular knowledge-based articles based at least in part on operational information obtained from BGP routers.

The customer may use editing tools 318 to edit, create, or modify an existing BGP router. For example, the customer may use the editing tools 318 to edit the operation of BGP routers associated with various network environments. Once a customer has established a connection to the BGP scaling service through the remote BGP management and visualization browser 302, the remote BGP management and visualization browser 302 may automatically populate the customer's display with the information in various components of the remote BGP management and visualization browser 302, such as the event viewer and knowledge base.

An operation enabled by the remote BGP management and visualization browser 302 includes a view of different regions from a drop down menu 320. The different regions may include different geographical regions or different logical regions within the same or different geographical regions. For example, different regions may include two or more separate virtual networks. Customers may navigate to a particular group using a graphical user interface element as illustrated in FIG. 3. Selection of a particular region may limit the information and generate views of information specific to the region.

Figure 4:
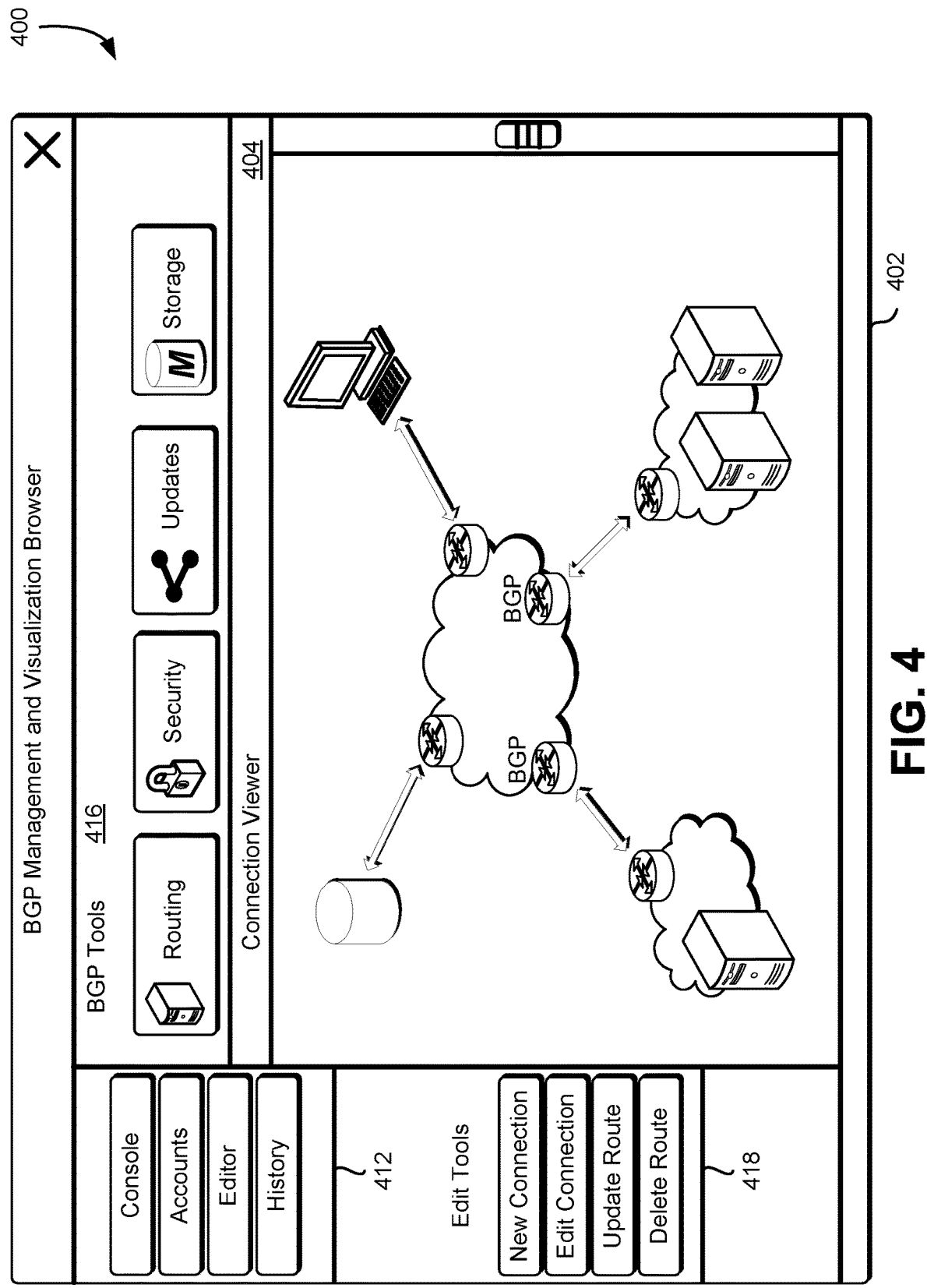
FIG. 4 is a diagram illustrating a management console implemented as a webpage for visualizing BGP routers and network connections in accordance with at least one embodiment.

FIG. 4 illustrates an example environment 400 where a remote BGP management and visualization browser 402 may be used to view the connection between two or more network environments through BGP routers as described in the present disclosure at least as described above in connection with FIG. 1 and in accordance with at least one embodiment. The remote BGP management and visualization browser 402 enables a customer to perform a variety of operations through the remote BGP management and visualization browser 402 as described above in connection with FIG. 3. In various embodiments, the remote BGP management and visualization browser 402 is a computer system service such as a web service and provided as an BGP service of the computing resource service provider as described in the present disclosure.

As illustrated in FIG. 4, the remote BGP management and visualization browser 402 is provided as a user interface executed by an application such as a web browser executing on a computer system operated by the customer, as well as other user interfaces that may be used to present networking information and BGP router information to the customer and may, in some embodiments, be generated by the computing resource service provider and sent to the customer's display for rendering. The remote BGP management and visualization browser 402 may include additional embodiments and features as described above in connection with FIG. 3. In addition, the remote BGP management and visualization browser 402 may include BGP tools 416, a set of options 412, and editing tools 418 as described above in connection with FIG. 3.

As illustrated by FIG. 4, the remote BGP management and visualization browser 402 also includes a connection viewer 404. The connection viewer 404, in an embodiment, displays BGP router peers and networked environments, including the computing resources included in the network environment, relative to a particular customer, region, account, BGP router, or other entity. The BGP scaling service may obtain the information displayed in the connection viewer 404 by querying the BGP routers or set of computing resources maintaining the adjacency-in information and/or adjacency-out information. Alternatively, the BGP scaling service obtains and stores information based at least in part on requests obtained from the customers through the remote BGP management and visualization browser 402.

Figure 5:
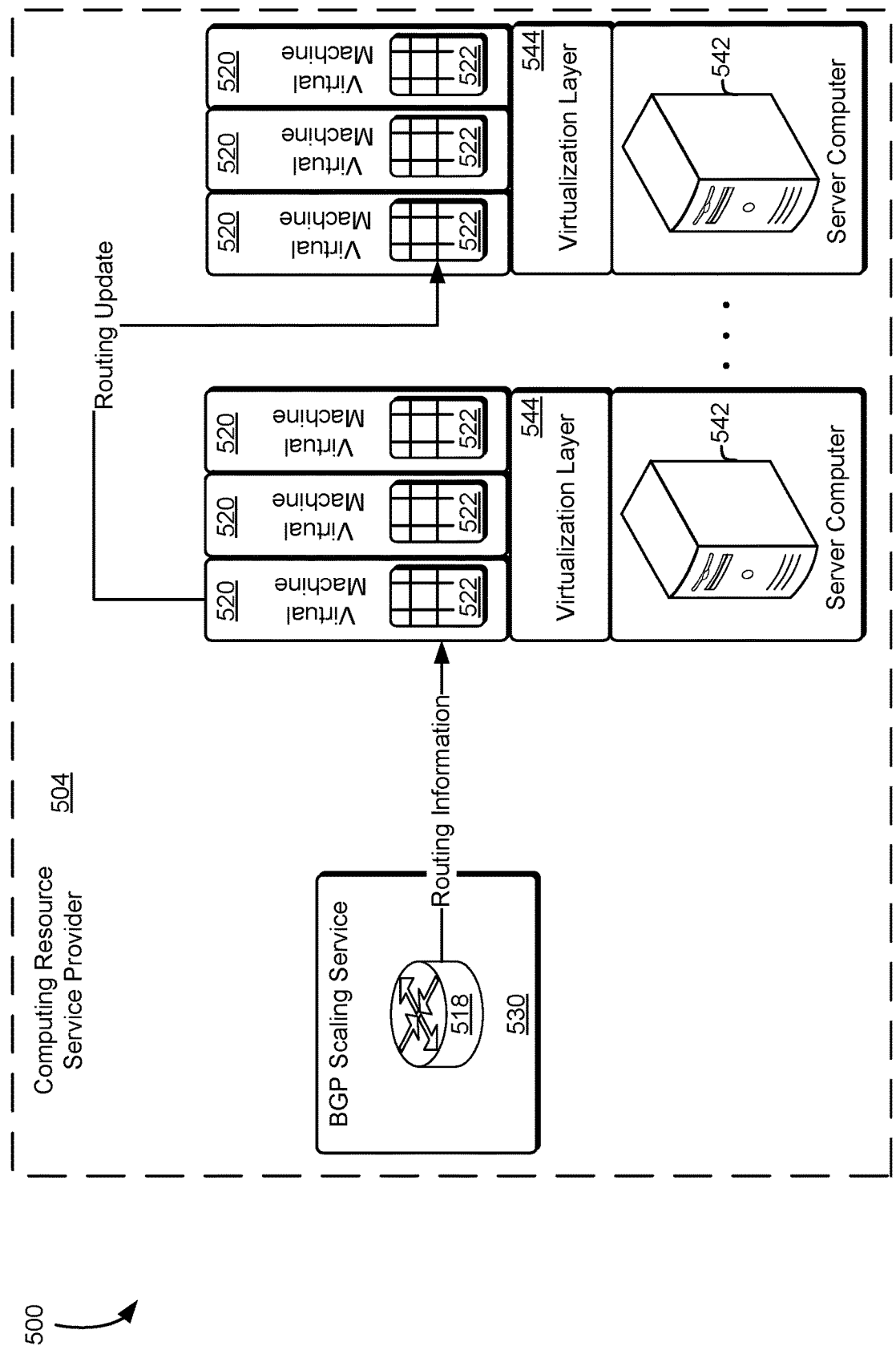
FIG. 5 illustrates an environment in which BGP routers may be provided updates in accordance with an embodiment.

FIG. 5 illustrates an environment 500 in which a BGP scaling service 530 of a computing resource service provider 504 may transmit routing information to routing table 522 executed by a computer system instance in accordance with at least one embodiment. The BGP scaling service 530, which may be implemented by physical hardware, is used by the computing resource service provider 504 as described above. In various embodiments, the BGP scaling service 530 also includes a service frontend and other component suitable for execution of various operations of various embodiments described in the present disclosure. The physical hardware may include a server computer 542, as described. In addition, a virtualization layer 544 may include a process or application executed by the server computer 542 that provides the computer system instances (e.g., virtual machines 520) with access to the physical resources of the server computer 542 as described above in connection with FIG. 3.

As described above, the BGP scaling service 530 enables a customer to implement BGP routers 518 using computing resources of the computing resource service provider 504. As illustrated in FIG. 5, the BGP router transmits routing information to a particular virtual machine instance 520 maintaining routing information associated with the BGP router 518. Although not illustrated in FIG. 5 for simplicity, the virtual machine instance 520, in various embodiments, is implementing the adjacency-in information of the BGP router 518. Similarly, the virtual machine instance 520 that receives the routing update, in various embodiments, implements the adjacency-out information of the BGP router 518. In various embodiments, the routing information is transmitted directly to the virtual machine instance 520 or other component of the server computer system 542 such as the virtualization layer 544. The virtualization layer 544 may expose to the virtual machine instance 520 a computing resource implemented by a database service or other services of the computing resource service provider 504 (not shown in FIG. 5 for simplicity). For example, the virtual machine instance 520 may execute an instance of a database connected to the virtual machine instance 520 over a network.

In various embodiments, the routing information causes the virtual machine 520 to process the routing information and generate a routing update and/or update message as defined by the BGP-4 protocol described above. Once the routing update is determined, the virtual machine 520 may determine one or more virtual machines 520 to provide the routing update. For example, the routing update is provided to the particular virtual machine 520 implementing the adjacency-out information of the BGP router 518. The adjacency-out information may then be updated based at least in part on the routing update. In various embodiments, the routing update may add and/or modify the set of routes available to and/or BGP peers connected to the BGP router 518. A BGP peers includes any pair of BGP routers (e.g., a computer systems implementing the BGP protocol) that have executed a peering handshake between the pair of BGP routers in accordance with the BGP protocol.

Figure 6:
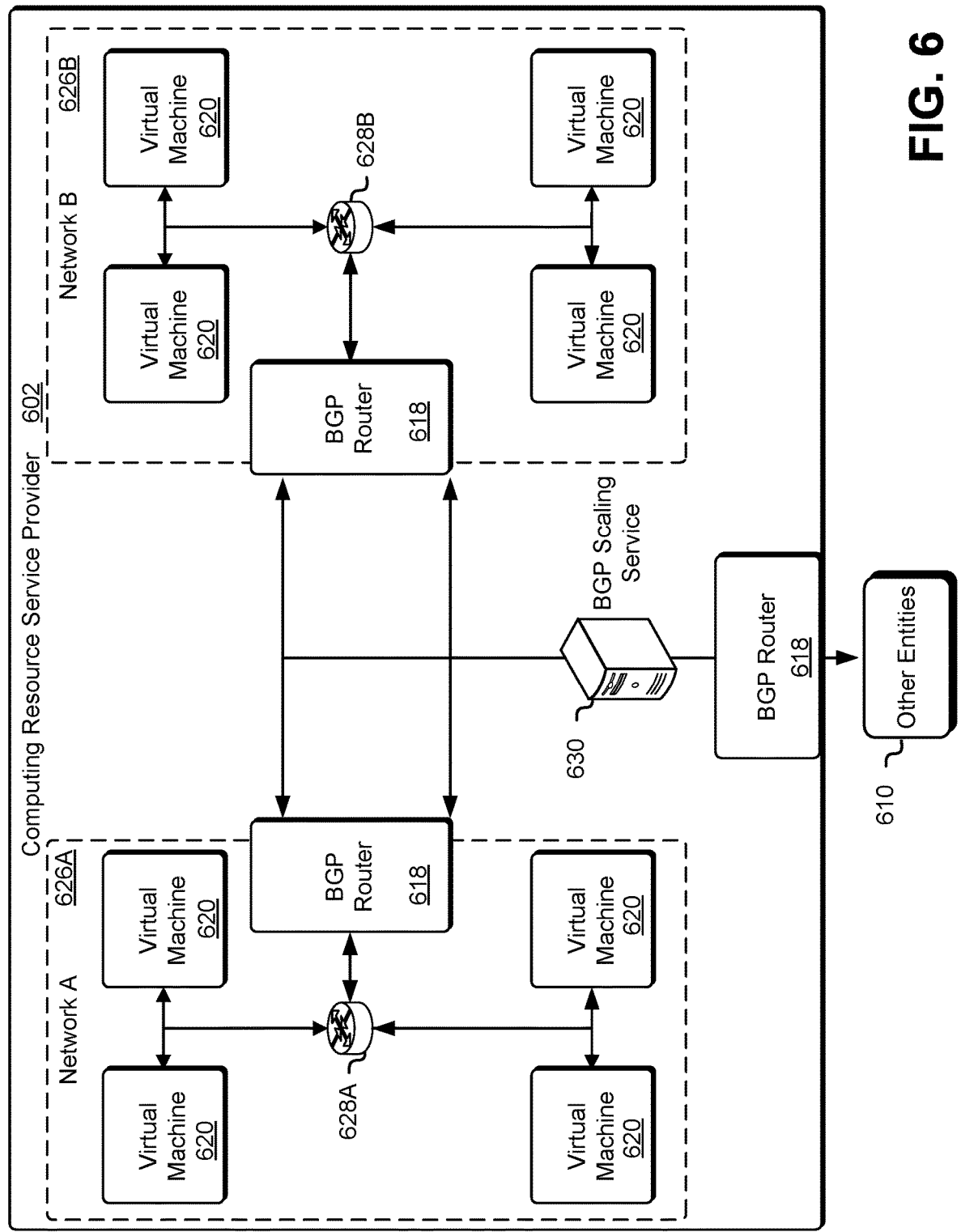
FIG. 6 illustrates an environment in which BGP routers may route network traffic between networks in accordance with an embodiment.

FIG. 6 illustrates an aspect of an environment 600 in which an embodiment may be practiced. Specifically, FIG. 6 depicts the communication between BGP routers 618 or components thereof and various entities in accordance with an embodiment. The environment 600 may include a BGP scaling service 630 that includes various components executed by servers in the sets of racks as described above. For example, a virtualization layer executing on the server computer in the sets of racks enables the physical hardware of the servers to be used to provide computational resources upon which one or more virtual machines 620 or other computing resources may operate to provide a BGP router 618, adjacency-in information, adjacency-out information, and/or a routing table as described above.

The virtualization layer enables the virtual machines 620 to access physical hardware on the server computer through virtual device drivers or other executable code on the virtual machine 620. The virtual machines 620 may include any number of computer systems and applications executed by customers of the computing resource service provider. For example, the virtual machine 620 includes an operating system and other applications operated by the customer. The computer system instances (e.g., virtual machines 620 and BGP routers 618) may be placed on the servers according to a rack diversity constraint where the sets of racks may be localized by different networks 626A-626B. The sets of racks may be physical hardware (e.g., server computers as described above) hosting one or more servers or in some embodiments may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. Additionally, the set of racks may be a "brick server" or other server that is a compact computer server module without a chassis that may include various processors, RAM, I/O, and storage configurations and may be designed to fit into various rack locations. The set of racks may also be connected by a top of rack switch.

The networks 626A-626B may be data communication pathways between one or more electronic devices. The networks 626A-626B may be wired or wireless networks and may use any of a variety of communications protocols for organizing their network traffic. The networks 626A-626B may allow the sharing of files, data, and other types of information between the one or more electronic devices accessible through the data communication pathways. Each of the networks 626A-626B may be associated with a router, such as an aggregation router that aggregates the servers of the respective set of racks into the common network, separate from the router associated with the other network. Each of the networks 626A-626B may be on a different subnet than the other network. For example, as illustrated in FIG. 6, the servers of the set of racks may be commonly connected to a router 628A. Similarly, the servers of the set of racks may be commonly connected to a router 628B. The routers 628A-628B may be networking devices that forward packets between computer networks, such as between the networks 626A-626B.

As illustrated in FIG. 6, the environment 600 also includes BGP routers 618 that receive network traffic directed to computing systems and/or computing resources such as virtual machines 620 executed by servers in the sets of racks, and enables interfacing with another network, such as the Internet, that may use different protocols. The BGP routers 618 may contain computing devices such as protocol translators, impedance matching devices, rate converters, fault isolators, or signal translators as necessary to provide system interoperability, such as preforming protocol conversion to enable computing devices to communicate between networks.

The BGP routers 618, as illustrated in FIG. 6, may include executable code that provides management of various routing operations. The BGP routers 618 may be a process or application executed by the virtual machine 620. The BGP routers 618, in an embodiment, manage communications between virtual machines 620 on different racks. In addition to enabling communication between virtual machines 620 in different networks, the BGP routers 618 may enable communications with other entities 610. The other entities may include any network environment as described above such as a customer data center or computing resources operated by entities distinct from the computing resource service provider 602.

Figure 7:
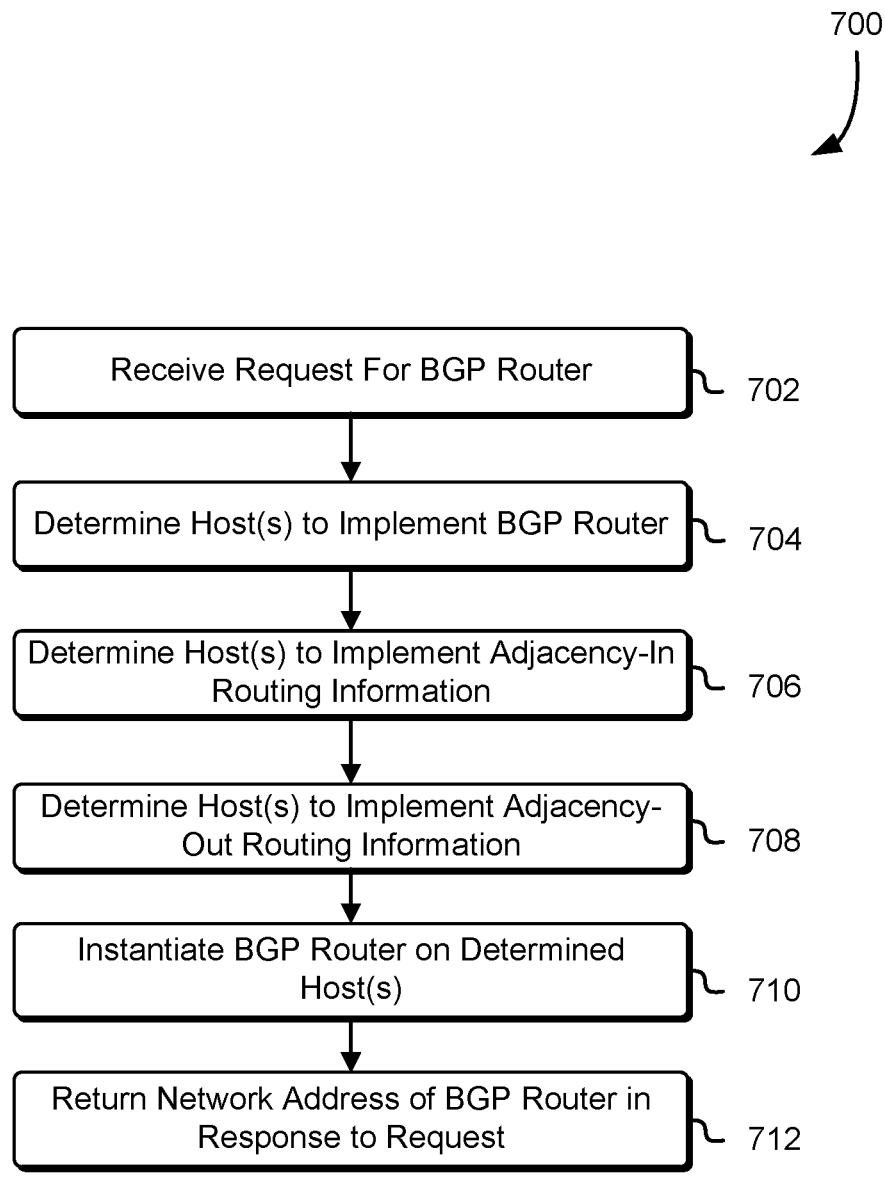
FIG. 7 is a block diagram illustrating a process for provisioning BGP routers in accordance with an embodiment.

FIG. 7 is a block diagram illustrating an example of a process 700 for provisioning a plurality of components of a BGP router in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 200 described in conjunction with FIG. 2, such as a BGP scaling service, by multiple computing devices in a distributed system of a computing resource service provider or by a service provided by a computing resource service provider. The process 700 includes a series of operations which result in the provisioning of a new BGP router. For example, the process 700 includes receiving a request for a BGP router 702. The request may be included in a service call such as a web service call or API call. In yet other embodiments, the request is generated at least in part on a customer's interactions with a management console exposed to the customer as a webpage. The request may be received at a service frontend of the BGP scaling service as described above.

In response to receiving the request, the BGP scaling service may fulfill the request by at least determining a set of hosts to implement the BGP router 704. As described above, the execution of the BGP router may be divided into at least three components. A first component may implement a BGP router component which manages communications over a TCP connection or other network connection. In other words, the first component, the BGP router, is responsible for transmission of data over the network under the protocol. The second and third components are the adjacency-in routing information and adjacency-out routing information described in greater detail above. The BGP scaling service may determine the host to implement the BGP router based at least in part on a placement algorithm as described above. For example, the placement algorithm selects a host from a set of hosts based at least in part on a round-robin schema. In another example, the placement algorithm selects the host from a set of hosts based at least in part on a remaining capacity of each host of the set of hosts. A variety of other placement algorithms and/or strategies is considered within the scope of the present disclosure.

Once the BGP scaling service has determined the host to implement the BGP router, the BGP scaling service may determine a host to implement the adjacency-in routing information 706. The adjacency-in routing information may be stored in a data structure such as a routing table as described above. In addition, the adjacency-in routing information may be implemented by a different type of host than the host that implements the BGP router. As described above, the host may be determined by a placement algorithm. Once the BGP scaling service has determined the host to implement the adjacency-in routing information, the BGP scaling service may determine the host to implement the adjacency-out routing information 708. In various embodiments, the placement algorithms used to determine the hosts to implement the various components of the BGP router may factor into the determination of the host selected to implement other components of the BGP router. In this manner the execution of the BGP router may be distributed between hosts.

After selecting the hosts to implement the various components of the of the BGP router, the BGP scaling service may instantiate the BGP router on the determined hosts 710. In one example, the BGP scaling service transmits a command directly to the hosts to execute the BGP router components. In yet another example, the BGP scaling service communicates with one or more other services of the computing resource service provider, such as a virtual computer system instance service, to instantiate the components of the BGP router. Once the BGP router has been instantiated, the BGP scaling service may return a network address of the BGP router in response to the request 712. As described above, the network address may enable the customer or other computing resources to communicate with the BGP router.

Note that one or more of the operations performed in 702-712 may be performed in various orders and combinations, including in parallel. For example, the system executing the process 700 may determine the hosts in executing the various components of the BGP router in parallel with each other. In numerous variations to the process 700, one or more of the operations 702-712 may be omitted or performed by other systems of services. For example, returning a response to the request may be omitted or performed by another service such as a notification service.

Figure 8:
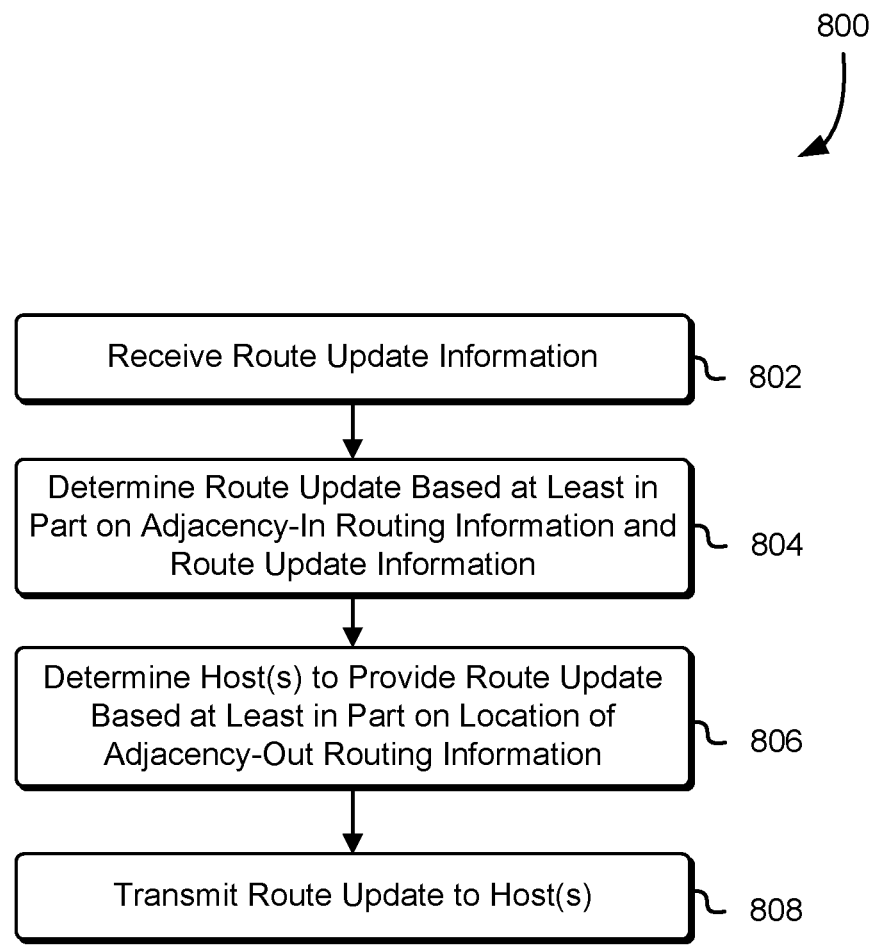
FIG. 8 is a block diagram illustrating a process for updating BGP routing information in accordance with an embodiment.

FIG. 8 is a block diagram illustrating an example of a process 800 for updating routing information for a BGP router in accordance with at least one embodiment. Some or all of the process 800 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 800 may be performed by any suitable system, such as a server in a data center; by various components of the environment 200 described in conjunction with FIG. 2, such as a BGP router; by multiple computing devices in a distributed system of a computing resource service provider; or by a service provided by a computing resource service provider. The process 800 includes a series of operations which result in the updating of routing information maintained by a BGP router. For example, the process 800 includes receiving route update information 802. As described above, the route update information may include the addition, modification, and/or deletion of one or more routes (e.g., BGP peers).

The route update may be received at the host implementing the adjacency-in routing information as described above. For example, the BGP router may receive information, determine the information includes an update to at least one router, and provide the information to the host implementing the adjacency-in routing information. The system executing the process 800 may then determine a route update base at least in part on the route update information and the adjacency-in routing information 804. The route update may be determined according to the protocol as described above. The system executing the process 800 may then determine the host to provide the route update based at least in part on a location of the adjacency-out routing information 806. In various embodiments, the update is to be applied to the adjacency-out routing information. Therefore, in such embodiments, the route update is provided to the host implementing the adjacency-out routing information. Once the host implementing the adjacency-out information is determined, the system executing the process 800 may transmit the route update to the host 808. As described in greater detail above, the host may apply the route update to the adjacency-out routing information.

Note that one or more of the operations performed in 802-808 may be performed in various orders and combinations, including in parallel. In numerous variations to the process 800, one or more of the operations 802-808 may be omitted or performed by other systems of services. For example, if the system executing the process 800 determines that the route update information generates a route update that does not modify the information maintained in the adjacency-out routing information, the route update may not be transmitted to the host.

Figure 9:
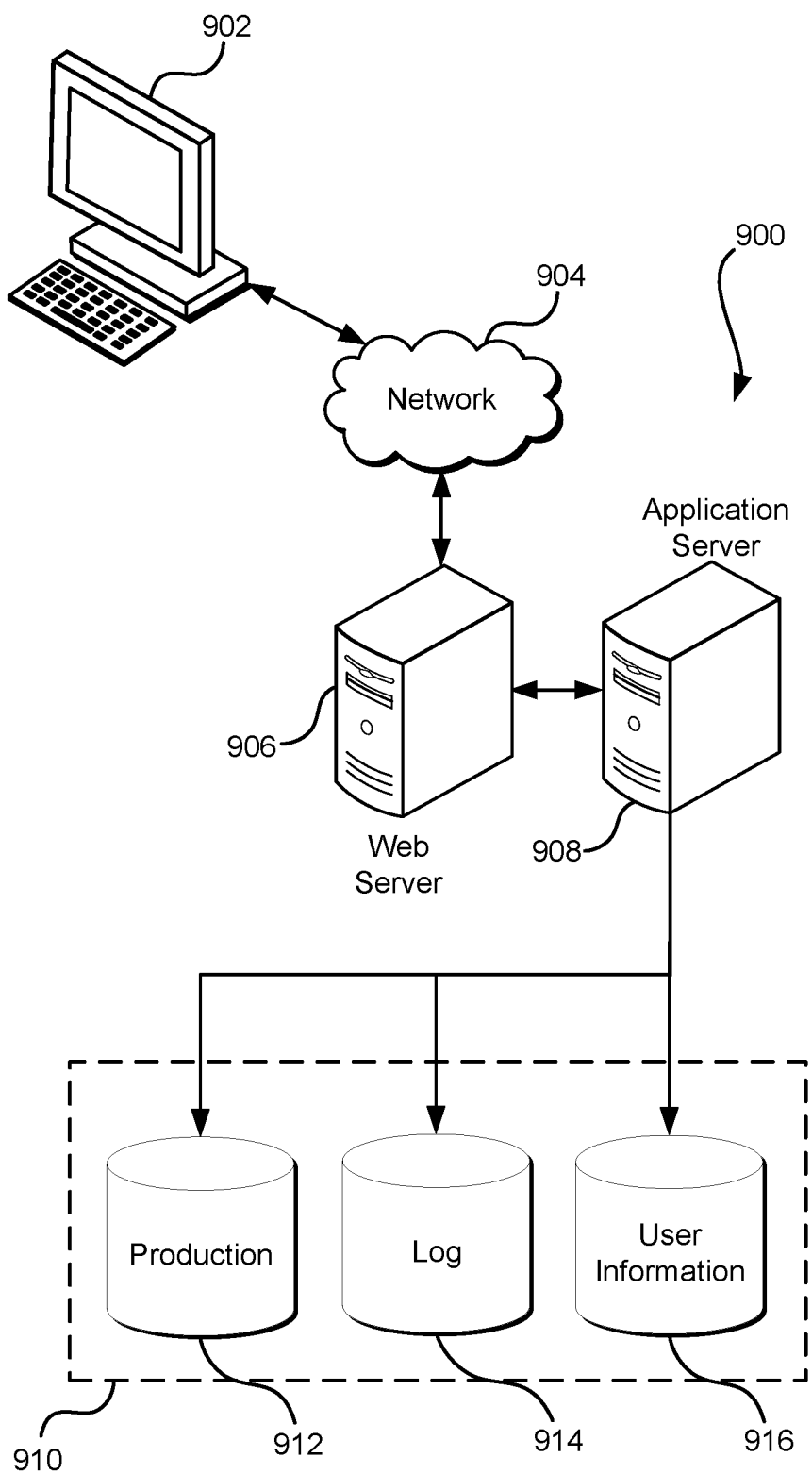
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
   receiving a request for a Border Gateway Protocol (BGP) router, the BGP router associated with a set of BGP peers;

determining a set of host computer systems to execute a plurality of components of the BGP router, the set of host computer systems connected over a network and maintained by a computer resource service provider;

selecting a first host of the set of host computer systems to execute the BGP router based at least in part on a sharding pattern, the first host being responsible for transmitting network traffic over a connection to at least one other computer system;

selecting a second host of a set of host computer systems to maintain adjacency-in routing information associated with the BGP router and provide the adjacency-in routing information to the first host based at least in part on the sharding pattern;

selecting a third host of the set of host computer systems to maintain adjacency-out routing information associated with the BGP router and provide the adjacency-out routing information to the first host based at least in part on the sharding pattern;

provisioning the first host, the second host, and the third host;

providing the adjacency-in routing information to the second host;

providing the adjacency-out routing information to the third host;

responding to the request by at least providing a first network address of the first host, the first network address enabling communication with the BGP router;

receiving, through a management console implemented as a user interface of a BGP scaling service, the adjacency-in routing information and the adjacency-out routing information associated with the BGP router; and determining to update the set of BGP peers with the adjacency-in routing information and the adjacency-out routing information.

2. The computer-implemented method of claim 1, wherein the computer-implemented method further comprises:

causing the routing information to be transmitted to the second host maintaining the adjacency-in routing information associated with the BGP router; and causing the second host to determine a routing update message based at least in part on the routing information.

3. The computer-implemented method of claim 2, wherein the computer-implemented method further comprises causing the second host to transmit the routing update message to the third host maintaining adjacency-out routing information associated with the BGP router.

4. A system, comprising:
one or more processors; and
memory storing computer-executable instructions that, as a result of execution by the one or more processors, cause the one or more processors to:
as part of fulfillment of a request to connect two or more autonomous systems, determine a set of hosts to implement a Border Gateway Protocol (BGP) router to connect the two or more autonomous systems;
select a first host of the set of hosts to implement the BGP router based at least in part on a sharding pattern;
select a second host of the set of hosts to maintain adjacency-in routing information for the BGP router based at least in part on the sharding pattern;
select a third host of the set of hosts to maintain adjacency-out routing information for the BGP router based at least in part on the sharding pattern;
wherein at least one of the first host, the second host, or the third host is a virtual host implemented by a virtual computer system service; and
cause the first host to provision the BGP router to cause the BGP router to route traffic over a connection between the two or more autonomous systems based at least in part on the adjacency-in routing information obtained from the second host and the adjacency-out routing information obtained from the third host.

5. The system of claim 4, wherein the first host, the second host, and the third host are selected from the set of hosts based at least in part on a placement algorithm that causes computing resources of the first host, second host, or third host to be shared with at least one other BGP router.

6. The system of claim 4, wherein the first host, the second host, and the third host are selected from the set of hosts based at least in part on a placement algorithm that causes the first host, second host, and third host to be selected based at least in part on a load associated with a portion of hosts of the set of hosts.

7. The system of claim 4, wherein the computer-executable instructions further cause the one or more processors to determine to rebalance the set of hosts by at least determining to move at least one component of the BGP router, the adjacency-in routing information, or the adjacency-out routing information to a new host of the set of hosts.

8. The system of claim 7, wherein determining to rebalance the set of hosts further comprises determining to rebalance the set of hosts based at least in part on a number of routing updates received at the BGP router.

9. The system of claim 7, wherein determining to rebalance the set of hosts further comprises determining to rebalance the set of hosts based at least in part on a size of a routing table maintained within the adjacency.

10. The system of claim 4, wherein the computer-executable instructions further cause the one or more processors to:
detect a failure of at least one host of the first host, the second host, or the third host; and
select at least one additional host of the set of hosts to replace the at least one host.

11. A set of non-transitory computer-readable storage media storing thereon executable instructions that, as a result of execution by one or more processors of a computer system, cause the computer system to:
determine a set of hosts suitable for implementing a Border Gateway Protocol (BGP) router, adjacency-in routing information associated with the BGP router, and adjacency-out routing information associated with the BGP router;
select a plurality of hosts of the set of hosts to provision the BGP router, the adjacency-in routing information, and the adjacency-out routing information such that the plurality of hosts are sharded across the set of hosts based at least in part on a sharding pattern, wherein at least one host of the plurality of hosts is a virtual host implemented by a virtual computer system service; and
cause the plurality of hosts to collectively implement the BGP router, the adjacency-in routing information, and the adjacency-out routing information.

12. The set of non-transitory computer-readable storage media of claim 11, wherein the executable instructions further cause the computer system to:

receive a request to establish a connection between a first virtual private network and a second virtual private network; and cause the BGP router to route traffic over a connection between the first virtual private network and the second virtual private network.

13. The set of non-transitory computer-readable storage media of claim 11, wherein the executable instructions further cause the computer system to:

receive a request to establish a connection between a virtual private network and a data center operated by a customer; and cause the BGP router to route traffic over a connection between the virtual private network and the data center.

14. The set of non-transitory computer-readable storage media of claim 11, wherein the executable instructions further cause the computer system to:

receive routing information associated with the BGP router;

cause at least one host of the plurality of hosts to determine an update to the adjacency-out routing information based at least in part on the routing information; and cause the at least one host to transmit the update to a first host of the plurality of hosts implementing the adjacency-out routing information.

15. The set of non-transitory computer-readable storage media of claim 11, wherein the executable instructions further cause the computer system to select the plurality of hosts based at least in part on an amount of computing capacity associated with at least a portion of hosts of the set of hosts.

16. The set of non-transitory computer-readable storage media of claim 11, wherein the instructions further cause the computer system to select the plurality of hosts based at least in part on a number of components of BGP routers supported by the plurality of hosts.

17. The set of non-transitory computer-readable storage media of claim 11, wherein the instructions further cause the computer system to select the plurality of hosts by at least shuffle sharding execution of components of the BGP router over the plurality of hosts based at least in part on customer identification information.

18. The computer-implemented method of claim 1, wherein the BGP scaling service receives requests and is managed with application program interface (API) calls.

19. The system of claim 4, wherein the sharding pattern is based at least in part on customer identification information.

20. The set of non-transitory computer-readable storage media of claim 11, wherein the executable instructions further cause the computer system to shard the adjacency-in routing information across the plurality of hosts.

* * * * *